United States Patent [19]

Stimple et al.

[11] 4,170,759

[45] Oct. 9, 1979

[54] ANTENNA SAMPLING SYSTEM

[75] Inventors: James R. Stimple, Hoffman Estates; Paul M. Erickson, Schaumburg, both of Ill.

[73] Assignee: Motorola, Inc., Schaumburg, Ill.

[21] Appl. No.: 792,942

[22] Filed: May 2, 1977

[51] Int. Cl.² .............................................. H04B 1/06
[52] U.S. Cl. ..................................... 325/51; 325/370; 325/304; 343/757; 343/876
[58] Field of Search .................... 325/51, 56, 302, 304, 325/307, 366, 370, 478, 368, 369, 371; 343/100 CS, 206, 754, 757, 876

[56] References Cited
U.S. PATENT DOCUMENTS

| | | |
|---|---|---|
| 2,594,087 | 4/1952 | Soffel .................................... 325/304 |
| 3,329,901 | 7/1967 | Case ...................................... 325/370 |
| 3,475,686 | 10/1969 | Holt, Jr. ............................... 325/304 |
| 3,537,011 | 10/1970 | Escoula ................................ 325/304 |

*Primary Examiner*—Robert L. Richardson
*Assistant Examiner*—Tommy P. Chin
*Attorney, Agent, or Firm*—James W. Gillman; Victor Myer

[57] ABSTRACT

Each of a plurality of antenna sectors is sequentially coupled to a receiver via an antenna switch. The switch is operated by control logic circuitry which monitors the peak signal levels of the signals received by each sector. Unique circuitry is implemented which prevents the control logic from responding to spurious transient signals processed by the receiver's tuned circuits following each instance of antenna switching.

3 Claims, 5 Drawing Figures

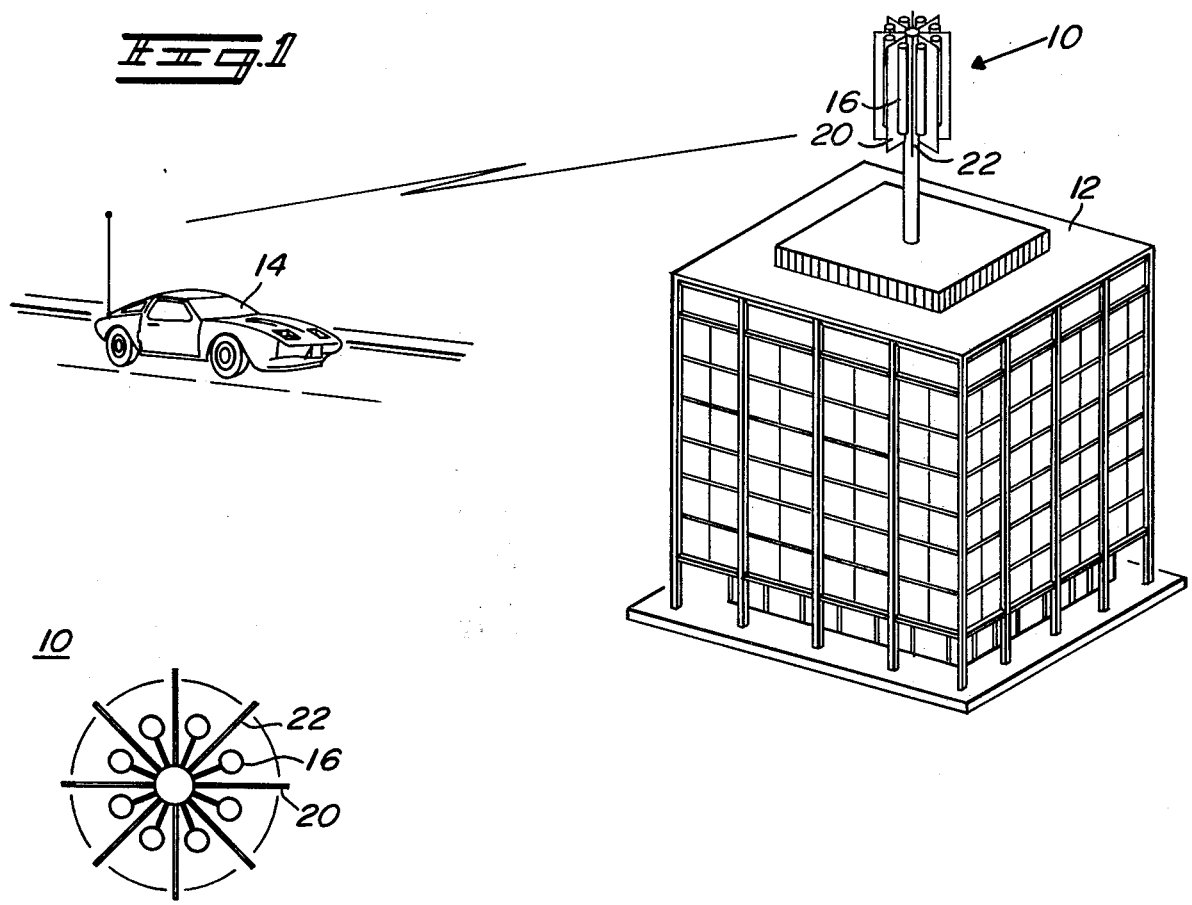
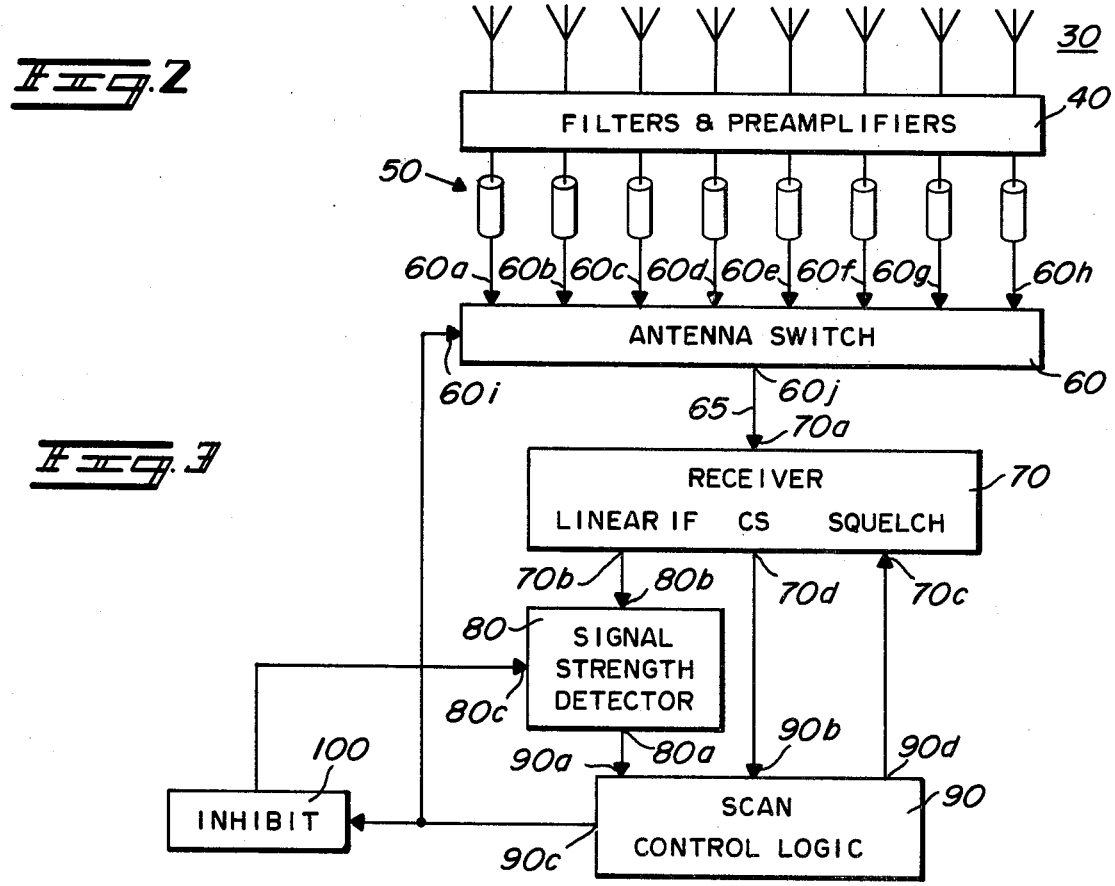

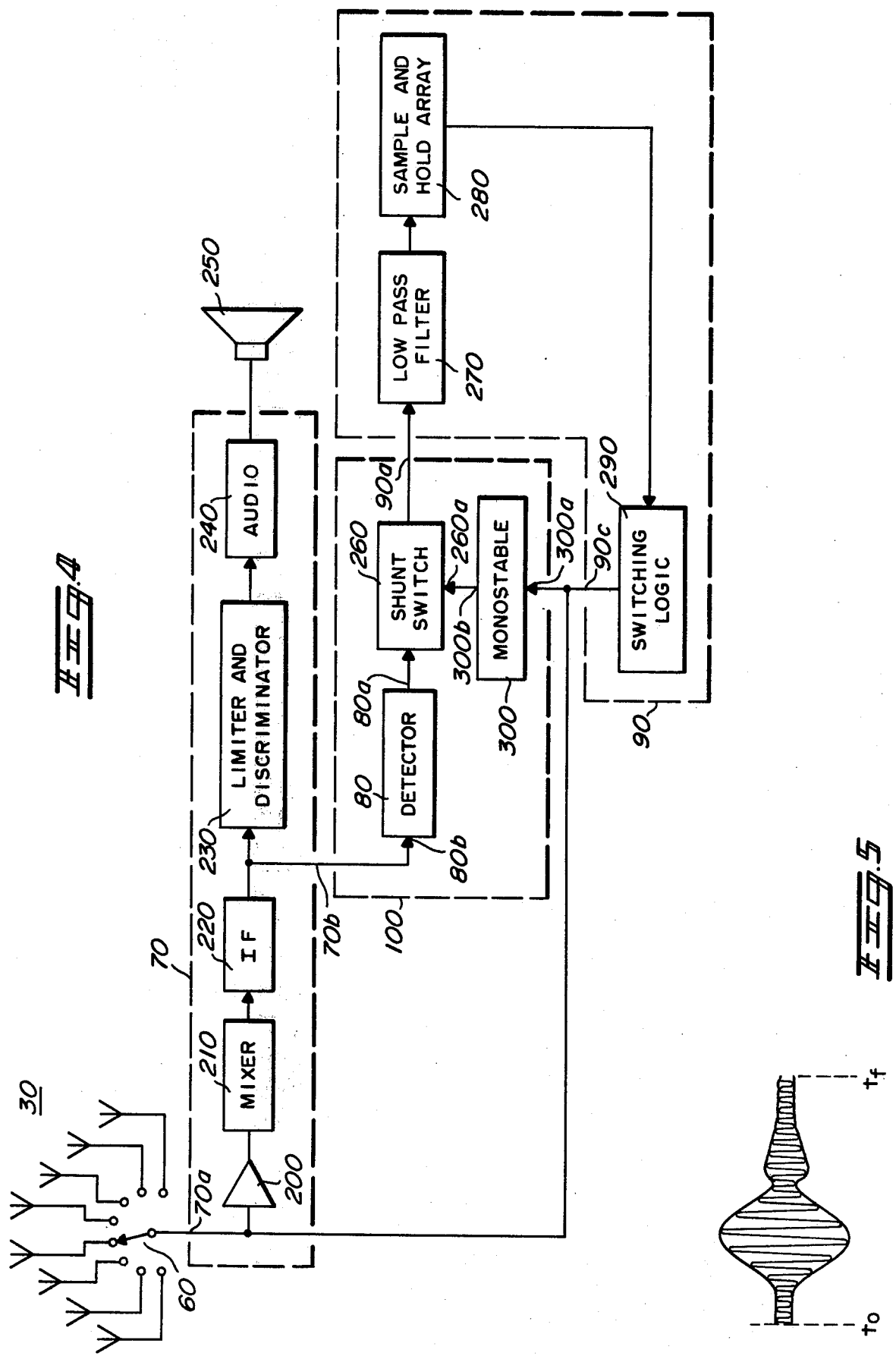

ANTENNA SAMPLING SYSTEM

BACKGROUND OF THE INVENTION

The present invention pertains to the radio communication art and, more particularly, to a multisectored antenna receiving system.

Several types of sectored antenna receiving systems have been developed for application in the radio communication art. Sectored antenna systems are commonly used in applications wherein the remote transmitter whose signal is to be received may be positioned in any one of multiple locations. Thus, such systems are normally designed in moving vehicle type applications. By using a sectored antenna array, as opposed to, for example, an omnidirectional antenna, signal to noise performance can be significantly enhanced thus producing a superior communication system.

While numerous sectored antenna scanning systems are known in the prior art, a particularly effective one is that described in U.S. Pat. No. 4,101,836, issued July 18, 1978, entitled "Sectored Antenna Receiving System", invented by Timothy Craig and James Stimple, and assigned to the same assignee as the instant application.

In the above referenced antenna scanning system control logic causes an antenna switch to sequentially couple each of a plurality of antenna sectors to a receiver. The signal level produced by each antenna is detected in appropriate circuitry and, if the detected signal levels for the one or more sectors exceeds a threshold level the control logic causes the antenna switch to scan the sectors in various predetermined modes.

A problem with such prior art scanning systems, and notably of the system referenced above, is that at the instance of antenna switching energy from off channel signals is translated to the desired channel and processed by the receiver's tuned circuits, thereby creating a transient, or spurious response. If allowed to pass to the control logic, this spurious response will be treated as a sector received signal. Thus, the system is subject to falsing.

One solution to the tuned stage generated transient signal problem is to reduce antenna switching times to the point whereby the generated transients are of insignificant magnitude. This solution has proven undesirable in applications wherein rapid antenna scanning is required.

SUMMARY OF THE INVENTION

It is an object of this invention, therefore, to provide a rapid scan antenna system wherein the system is immune to transients generated by the switching operation.

Briefly, according to the invention, the radio frequency communication system comprises an antenna having a plurality of sectors, each sector being predeterminedly oriented with respect to the remaining sectors. An antenna switch has a plurality of inputs, each of which is coupled to a corresponding antenna sector, a control terminal and an output terminal. The antenna switch responds to signals at its control terminal to couple a selected input terminal to its output terminal. The output from the antenna switch couples to a radio frequency receiver. A detector processes the output from the receiver to detect the level of signals thereat. Control logic circuitry responds to the detector by generating and applying predetermined control signals to the antenna switch thereby causing predetermined switching of the antenna sectors in response thereto. An inhibit means inhibits operation of the detector for a predetermined time interval following each instant of antenna switching whereby the control logic does not respond to spurious responses caused by the antenna switching.

BRIEF DESCRIPTION OF THE DRAWINGS

FIG. 1 illustrates an eight sector horizontally directive antenna array which is suitable for communication with a remotely located vehicular transmitter;

FIG. 2 is a top view of the radiation pattern of the eight sectored antenna array shown in FIG. 1;

FIG. 3 is a generalized block diagram of a preferred embodiment of the sectored antenna receiving system;

FIG. 4 is a detailed block diagram illustrating the antenna inhibit circuit operating in conjunction with all of the portions of the antenna switching system; and FIG. 5 is a waveform illustrating spurious responses generated by the tuned circuits of the receiver following the instance of antenna switching.

DETAILED DESCRIPTION OF THE PREFERRED EMBODIMENT OF THE INVENTION

FIG. 1 illustrates a preferred application of the invention used as a communication system for land mobile operation. Here, a sectored antenna array 10 is shown mounted atop a building 12. Communication from the array is to be established with a remotely located transmitter, which is illustrated as being carried by a vehicle 14.

The array 10 includes eight sectors, one of which is indicated at 16, which are nestled between 45° angle reflectors, two of which are indicated at 20 and 22. Each sector is horizontally directive and is predeterminedly oriented with respect to the remaining sectors such that all sectors in the array are capable of covering a total horizontal angle of 360°. It should be understood that, depending upon the particular application, any number of sectors may be employed and the sectors may be arranged to cover any desired receiving angle.

Horizontally directive antenna sectors are well known in the antenna art and are commercially available from many manufacturers such that a detailed description thereof is unnecessary.

FIG. 2 is a top view of the antenna array 10 showing the eight antenna elements, one of which is indicated at 16, and the 45° reflectors, two being shown at 20 and 22. As a result of the design of the antenna sector and its corresponding reflectors, each antenna sector is capable of receiving transmitted signals which are generated from within a defined horizontal angle. It should be understood that since each sector of the antenna array is horizontally directive, the array is capable of superior signal to noise performance over an omnidirectional antenna.

FIG. 3 is a generalized block diagram which illustrates the fundamental building blocks of the scanning system. Here, the array of sectored antenna elements 30 are mounted, as for example, in FIG. 1, in predetermined orientation on top of a suitable structure. Each antenna sector feeds to a filter and preamplifier circuit 40 which provides gain to the sector received signals at those frequencies of interest. The amplified sectored received signals pass over coaxial cables 50 to an antenna switch 60. The antenna switch 60 comprises a plurality of input terminals 60a, 60b, 60c, 60d, 60e, 60f, 60g, and 60h, an output terminal 60j and a control input terminal 60i. In response to control signals received at its control input terminal 60f, the antenna switch 60 couples a selected one of the sectors 30 to the antenna switch output terminals 60e.

The output 60e from the antenna switch 60 is coupled via a suitable conductor 65 to the input 70a of a radio frequency receiver 70. Radio frequency receiver 70 is of conventional design in that it mixes the input radio frequency signals to an intermediate frequency, thereafter filtering the signal via an intermediate frequency stage, detecting the signals and reproducing the signals as audio or data outputs. The prelimited output from the intermediate frequency stage is available at a receiver output terminal 70b. The receiver includes conventional squelch circuitry such that when an appropriate signal is applied at a squelch input terminal 70c the output from the receiver may be disabled. In addition, the receiver includes decoding circuitry capable of detecting the presence of a coded signal on an incoming sector receiver signal. Such coding systems are very common in land mobile communication systems and normally would include information as to the identity of the transmitting station as well as other pertinent information of use to the system. Commonly, such coded signals are predetermined subaudible or audible tones which may be decoded by the presence of suitable bandpass filters, vibrating reeds or the like. A second output 70d from the receiver is activated in response to the receiver decoding the presence of a coded signal on the sector receive signal.

The intermediate frequency output 70b from the receiver is coupled to a signal strength detector 80 which, as is shown in FIG. 3, may be a separate unit, or it may be incorporated within the receiver 70. The signal strength detector 80 produces a signal at its output 80a, which signal is indicative of the level of signals received at its input 80b. The signal strength detector 80 is provided with a second input 80c which responds to inhibit signals applied thereat to inhibit an output from the signal strength detector. The signal strength signals are in turn passed to the first input 90a of a scan control logic circuitry 90. The second input 90b of the scan control logic 90 couples to the coded signal output 70d of the receiver 70. The scan control logic circuitry 90 processes its input signals and produces appropriate control signals on its first output 90c which are in turn coupled to the control input terminal 60i of the antenna switch 60. Also, appropriate signals are created at the scan control logic second output 90d which are coupled to the squelch input 70c of the receiver 70. Detailed operation of the scan control logic 90 is fully described in the copending application of Craig and Stimple, cited supra. Briefly, the scan control logic 90 responds to its received input signals to operate the sectored receiving system in one of a number of modes. For the condition wherein none of the sectors receives an input signal above a predetermined level, a control signal from the scan control logic applied to the control input terminal 60i of the antenna switch 60 causes the receiver to be sequentially coupled to each of the antenna sectors. Once a sector receives a signal whose amplitude is such that the output from the signal strength detector is above the given threshold level, the scan control logic operates the system in a second, or continuing scan mode. In this mode each antenna sector is again scanned for a predetermined continuing scan time, with the relative signal strength from each sector being stored in a first sample and hold array within the scan control logic 90. At the end of the continued sampling period that sector which recorded the largest signal during both scanning intervals is coupled to the receiver. If the system is not operating in the coded signal mode, the receiver will remain coupled to that sector until such time as the signal therefrom drops to a predetermined level for a predetermined time period.

If, however, the system is operating in a mode whereby it only responds to the input signals which contain a coded signal, at the end of the continuing sampling period the receiver will be coupled to that sector which receives the strongest signal and which contains the coded signal. In this mode if, by the conclusion of the continuing signal mode, none of the sectors has received the coded signal, thus indicating that an interferer is present, the scan control logic operates the system in an alternate scan mode wherein a general scan of the sectors is made as in the first mode but the output from each sector is applied to a second sample hold array. Now, each input from a sector to the second sample hold array is compared with the stored peak value for the sector and the first sample hold array caused by the interferer. If The signal strength from any sector in the second sample hold array is a predetermined voltage $\Delta V$ above its stored value in the first sample hold array the scan control logic once more activates the system to the continuing scan mode. As before, in the continuing scan mode all sectors are scanned for a predetermined time interval, with the peak value signal level from each sector being stored now in the second sample hold array. At the end of the continuing scan interval the scan control logic couples the receiver to that sector which received the largest signal and has the greatest $\Delta V$. As before, the receiver then checks to determine whether or not the signal received by the selected sector contains the proper coded signal. If it does, the receiver continues to be coupled to that sector until the signal from that sector diminishes to a given level for a predetermined time period. If that signal does not contain the coded signal the scan control logic causes the system to revert to the first, or general scan mode.

Since the scan control logic 90 causes activation of the antenna switch 60 and responds to the peak signal level from the signal strength detector 80 corresponding to each antenna sector, it is imperative that the signal strength levels from the detector 80 properly correspond to actual signal levels received by the sectors, and not be due to any spurious responses or transients generated within the antenna switching system. It has been found that following the instance of antenna switching, a spurious response is received at and processed by the tuned stages, such as the intermediate frequency filter and amplifier, of the receiver 70 thereby producing an undesirable transient response. This transient response is illustrated in FIG. 5 wherein the time $t_0$ indicates the instance of antenna switching. The transient occurs for a total period of $t_t$. If this transient is allowed to pass to the signal strength detector 80 and then to the sample hold array at the input 90a of the scan control logic 90, the signal stored in the array may correspond to the amplitude of the transient and not to the actual received signal levels. Thus, the control logic might respond to erroneous input information and activate to any one of its previously described modes.

It should be noted that in some applications undesired transients arise solely from switching transients induced in high Q stages such as the IF filter and amplifier. The instant invention would likewise correct for these potential error signals.

To prevent system falsing, an inhibit circuit 100 couples to the output 90c of the scan control logic 90 and senses the instance of antenna switching time. Included within the inhibit circuit 100 is appropriate circuitry which responds to the instance of antenna switching to produce an inhibit signal at the inhibit input 80c of the signal strength detector 80. This inhibit signal is of appropriate duration, preferably of length $(t_f-t_o)$ or greater, whereby the spurious responses from the receiver due to antenna switching do not reach the control logic 90.

FIG. 4 is a more complete diagram illustrating operation of the inhibit circuit 100. Here the antenna sector array 30 is coupled via an antenna switch 60 to the receiver 70 at its input 70a. The receiver includes an RF amplifier 200, a conventional mixer stage 210 and an intermediate frequency filter and amplifier 220. The output from the intermediate frequency stage 220 is limited and detected in the typical manner via a limiter and detector 230 and passed via an audio amplifier 240 to a speaker 250. The output from the intermediate frequency stage 220 is also routed via an output 70b to the input 80b of the signal strength detector 80. In series with the signal strength detector 80 is a shunt switch 260 which couples the detector outputs 80a to the input 90a of the scan control logic 90. Provided in the scan control logic 90 is a low pass filter 270 which couples the signal strength level signals from the detector 80 to a sample and hold array 280. As described above, also provided within the scan control logic 90 is switching logic 290 which responds to a condition of peak signal levels in the sample and hold array to produce appropriate control signals at the scan control logic output 90c thereby used to activate the antenna switch 60 in a desired mode. Also coupled to the output 90c of the switching logic 290 is the input 300a of a monostable multivibrator 300. The monostable responds to transitions at its input 300a to produce an output pulse of predetermined time duration at its output 300b. This output pulse from the monostable 300 couples to the control input 260a of the shunt switch 260. Thus, for the interval of the monostable produced pulse, the shunt switch shunts the output 80a from the detector 80 such that these signals are prevented from passing to the scan control logic 90.

FIG. 5 illustrates the spurious, or transient noise burst created by the tuning circuits in the receiver, especially the intermediate frequency stage 220 upon the instance of antenna switching. The time $t_o$ represents exact instance of antenna switching, and the total time duration $(t_f-t_o)$ is the approximate length of the produced transient response. It is important that these transients be prevented from entering the scan control logic 90 since, otherwise, the scan control logic will act upon these signals as if they were received on channel signals from the antenna sectors. Thus, the monostable multivibrator 300 is designed to produce an output pulse of approximate length equal to $(t_f-t_o)$ whereby at the instance of antenna switching the monostable created timed pulse activates the shunt switch 60 thereby preventing the output from the detector from entering the scan control logic 90.

It should be understood that the time duration of the pulse created by the monostable 300 may be adjusted to eliminate any transients caused by the system during the instance of antenna switching. By utilizing the inhibit circuit 100, the instant invention is capable of flawless scan control operation, while permitting very high antenna sampling rates.

While a preferred embodiment of the invention has been described in detail it should be understood that many modifications and variations thereto are possible, all of which fall within the true spirit and scope of the invention.

We claim:

1. A radio frequency communication system comprising:
   a sectored antenna means having a plurality of sectors, each sector predeterminedly oriented with respect to the remaining sectors;
   an antenna switch means having a plurality of input terminals, a control terminal, and an output terminal and further including means responsive to control signals at the control terminal to couple a selected input terminal to the output terminal;
   antenna coupling means for coupling each antenna sector to a predetermined input terminal of the antenna switch means;
   receiver means adapted for receiving radio frequency signals;
   receiver coupling means for coupling the antenna switch means output terminal to the receiver means;
   detector means for processing the output of the receiver means and detecting the levels of the signals thereat;
   control logic means responsive to said detector means for generating and applying predetermined control signals to said antenna switch means to cause predetermined switching of the antenna sectors in response thereto; and
   inhibit means for inhibiting operation of the detector means for a predetermined time interval following each instant of antenna switching,
   whereby the control logic means is pevented from responding to spurious responses caused by the antenna switching.

2. The radio frequency communication system of claim 1 wherein:
   the receiver means includes tuned stages;
   the detector means couples to the output of the tuned stages; and
   the inhibit means inhibits operation of the detector means for a sufficient interval to prevent spurious responses processed by said receiver tuned stages from affecting said control logic means.

3. The radio frequency communication system of claim 2 wherein the control logic means responds to the peak amplitude of the received signal from each antenna sector to thereby cause predetermined switching of the antenna sectors.

* * * * *